(12) United States Patent
Brandenburg et al.

(10) Patent No.: US 7,726,972 B1
(45) Date of Patent: Jun. 1, 2010

(54) LIQUID METAL ROTARY CONNECTOR APPARATUS FOR A VEHICLE STEERING WHEEL AND COLUMN

(75) Inventors: Scott D. Brandenburg, Kokomo, IN (US); Shing Yeh, Kokomo, IN (US); Mark W. Gose, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/505,088

(22) Filed: Jul. 17, 2009

(51) Int. Cl.
*H01R 39/00* (2006.01)

(52) U.S. Cl. .................. 439/5; 439/13; 439/15
(58) Field of Classification Search .......... 439/5, 439/13, 15
See application file for complete search history.

(56) References Cited

U.S. PATENT DOCUMENTS

| 5,170,930 | A | * | 12/1992 | Dolbear et al. ........... 228/123.1 |
| 5,498,164 | A | | 3/1996 | Ward et al. |
| 5,626,484 | A | * | 5/1997 | Okuyama et al. ........... 439/179 |
| 5,779,492 | A | * | 7/1998 | Okuyama et al. ........... 439/179 |
| 5,969,534 | A | * | 10/1999 | Hubner et al. .............. 324/757 |
| 6,600,405 | B1 | * | 7/2003 | Kremers et al. ............... 337/21 |
| 6,663,395 | B2 | | 12/2003 | Sobhani |
| 6,665,186 | B1 | | 12/2003 | Calmidi et al. |
| 7,198,412 | B2 | * | 4/2007 | Hamasaki et al. ............. 385/88 |
| 7,524,194 | B2 | * | 4/2009 | Eldridge et al. ............... 439/66 |

* cited by examiner

*Primary Examiner*—Tho D Ta
(74) *Attorney, Agent, or Firm*—Jimmy L. Funke

(57) ABSTRACT

A liquid metal rotary connector for a vehicle steering mechanism utilizes a conductive alloy comprising Gallium, Indium, Tin and Zinc to electrically couple stationary and rotary terminals of the connector. The alloy is a liquid at ambient temperatures, and has a melting point of −36° C., though testing has shown that it operates satisfactorily at temperatures as low as −40° C. In a preferred arrangement, the rotary connector provides a two-wire connection through which power is supplied from the steering column to the steering wheel, and electronic modules located in the steering column and the steering wheel support bi-directional data communication through voltage and current modulation of the supplied power.

2 Claims, 3 Drawing Sheets

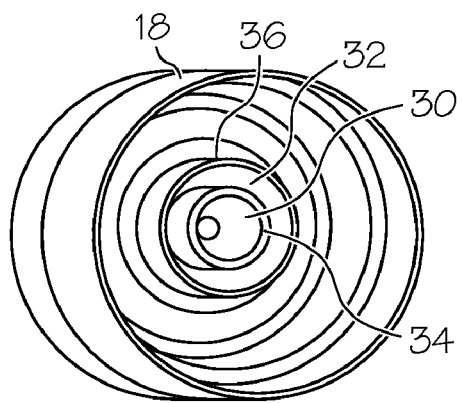
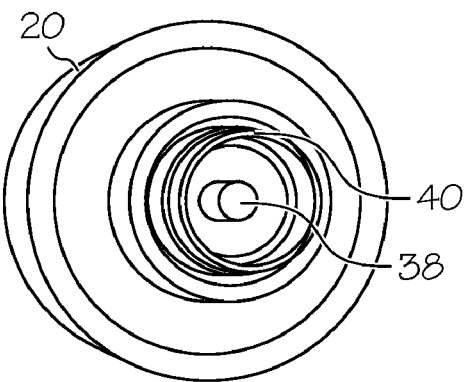
FIG. 2A FIG. 2B
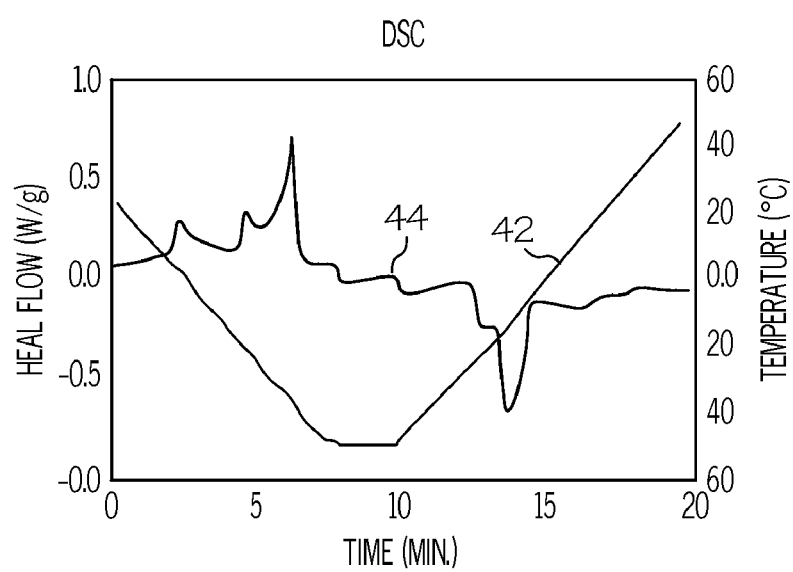
FIG. 3

LIQUID METAL ROTARY CONNECTOR APPARATUS FOR A VEHICLE STEERING WHEEL AND COLUMN

TECHNICAL FIELD

The present invention relates to a rotary connector for a vehicle steering wheel and column, and more particularly to a connector including a novel liquid metal interface between rotary and non-rotary terminals.

BACKGROUND OF THE INVENTION

Nearly all vehicle steering mechanisms are equipped with a rotary connector for coupling electrical power and signals between the fixed steering column and the rotatable steering wheel since the steering wheel supports air bag electronics, and in many cases, electrical switches for controlling audio, cruise control and HVAC functions. Two types of rotary connectors are commonly used in vehicles: a sliding contact or slip-ring connector, and a flexible cable or clock-spring connector. These types of connectors have various drawbacks such as generation of audible and electrical noise, a limited number of signal channels, and lack of durability due to wear and contamination.

To overcome the problems associated with the aforementioned rotary connectors, it has been proposed to use a rotary connector in which a metallic conductor (typically mercury) that is liquid at ambient temperatures electrically bridges stationary terminals in the steering column and rotary terminals in the steering wheel; see, for example, the U.S. Pat. No. 5,498,164 to Ward et al., issued Mar. 12, 1996. While the liquid metal approach is potentially advantageous in that it eliminates most noise issues, as well as durability issues due to wear, mercury is no longer approved for usage in consumer applications, and the number of signal channels that can be obtained with a liquid metal connector is quite limited as a practical matter.

The problem with mercury has been solved for many applications such as glass-tube thermometers by the development of a substitute alloy of Gallium, Indium and Tin (available under the tradename Galinstan), which at ambient pressure, remains a liquid between −28° C. and +1300° C. However, this alloy is not suitable for automotive usage because the ambient temperature in an automotive environment may be well lower than the alloy's melting point of −28° C. Accordingly, what is needed is an improved liquid metal rotary connector that is suitable for the automotive environment and that provides an adequate number of power and signal channels.

SUMMARY OF THE INVENTION

The present invention is directed to a liquid metal rotary connector for a vehicle steering mechanism, where a novel conductive alloy comprising Gallium, Indium, Tin and Zinc is used to electrically couple stationary and rotary terminals of the connector. The new alloy is a liquid at ambient temperatures, and has a melting point of −36° C., though testing has shown that it operates satisfactorily at temperatures as low as −40° C. In a preferred arrangement, the rotary connector provides a two-wire connection through which power is supplied from the steering column to the steering wheel, and electronic modules located in the steering column and the steering wheel support bi-directional data communication through voltage and current modulation of the supplied power.

BRIEF DESCRIPTION OF THE DRAWINGS

FIG. 2A is an isometric interior view of the female portion of the rotary connector of FIG. 1.

FIG. 2B is an isometric interior view of the male portion of the rotary connector of FIG. 1.

FIG. 3 is a graph showing a heat flow characteristic of a liquid metal alloy captured in the female portion of FIG. 2A.

DESCRIPTION OF THE PREFERRED EMBODIMENT

The present invention is directed to a liquid metal rotary connector that is particularly well suited for use in a vehicle steering mechanism, and it is described herein in connection with that environment. However, it will be appreciated that the subject rotary connector can also be used in non-vehicle applications requiring a non-mercury metal that remains in a liquid state at temperatures as low as −40° C., at least one power channel, and multiple signal channels.

Figure 1:
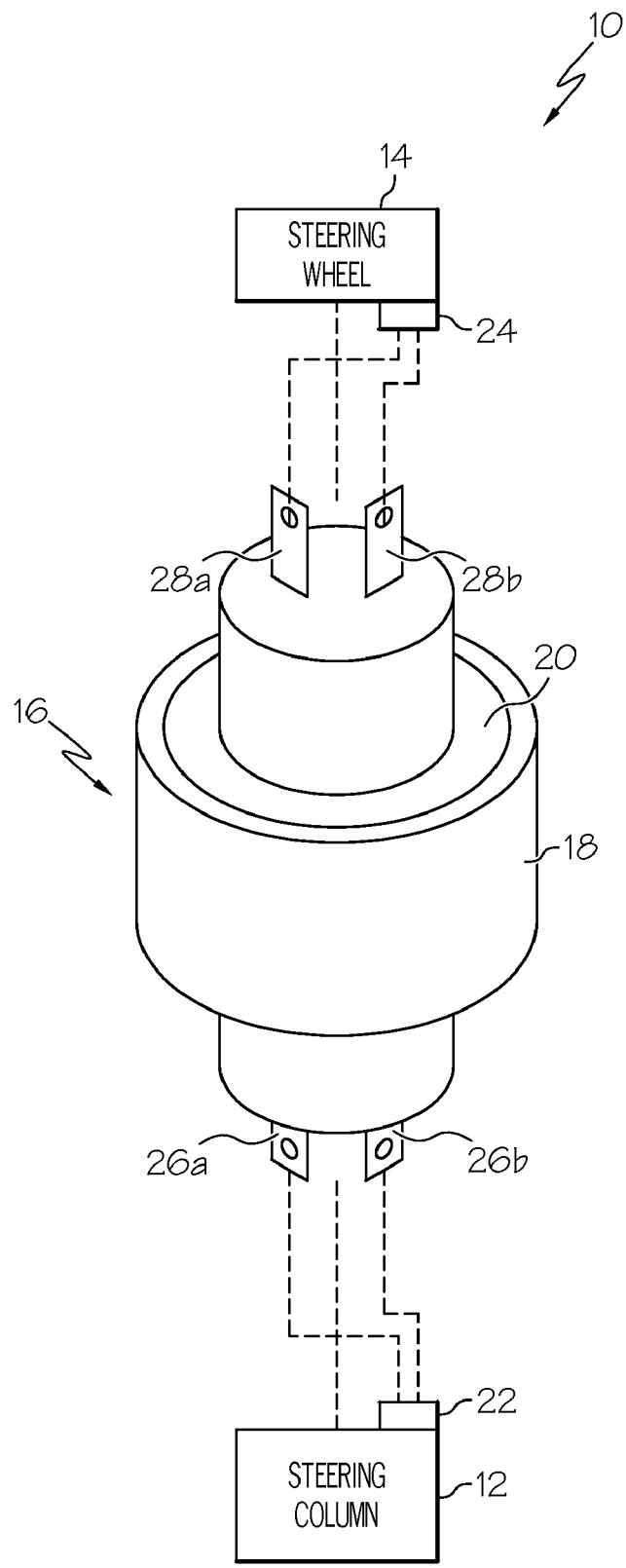
FIG. 1 is an isometric and block diagram illustrating the rotary connector of the present invention, including a female portion coupled to a steering column and associated electronic module, and a male portion coupled to a steering wheel and associated electronic module.

Referring to FIG. 1, the reference numeral 10 generally designates a vehicle steering mechanism according to this invention, including a fixed steering column 12, a rotatable steering wheel 14 that is mechanically coupled to a steering shaft (not shown) within column 12, and a rotary connector mechanism 16. For convenience, the "keepout" opening in rotary connector mechanism 16 for accommodating the steering shaft has also been omitted. The rotary connector mechanism 16 includes a female portion 18 mechanically coupled to the column 12, and a male portion 20 nested within the female portion 18 and mechanically coupled to steering wheel 14 for rotation therewith. Thus, the male portion 20 rotates with respect to the female portion 18 as the steering wheel 14 is rotated with respect to the column 12. The steering mechanism 10 additionally includes two electronic modules: a column electronic module 22 mounted in column 12, and a wheel electronic module 24 mounted in steering wheel 14. A first set of terminals 26a, 26b protruding from the female portion 18 of the rotary connector mechanism 16 are coupled to the column electronic module 22, and a second set of terminals 28a, 28b protruding from the male portion 20 of rotary connector mechanism 16 are coupled to the wheel electronic module 24.

In general, the rotary connector mechanism 16 provides a two-wire coupling between the fixed column 12 and the rotatable steering wheel 14 for supplying power to the steering wheel 14 and supporting bi-directional data communication between column electronic module 22 and wheel electronic module 24. As explained below, the bi-directional data communication is achieved through current and voltage modulation of the power supplied through rotary connector mechanism 16. In a typical application, steering wheel 14 is equipped with an airbag and a number of momentary contact switches for controlling the operation of the vehicle's audio, cruise control, and/or HVAC systems. Power is needed in steering wheel 14 for airbag diagnostics, energy reserve and deployment, for backlighting the various steering wheel switches, and for decoding the switch states. And data channels are needed for conveying airbag diagnostic information and deployment commands, switch states, and desired lighting level.

FIGS. 2A and 2B respectively depict interior views of the female and male portions 18 and 20 of the rotary connector mechanism 16. Referring to FIG. 2A, the female portion 18 has inner and outer cylindrical wells 30, 32 defined by a pair of differential-diameter insulative rings 34, 36 concentrically mounted in the closed end of the female portion 18. The inner well 30 is defined by the space within ring 34, and the outer well 32 is defined by the space between rings 34 and 36. The terminal 26a extends into the closed end of inner well 30, the terminal 26b extends into the closed end of outer well 32, and a quantity of conductive liquid metal is dispensed into each of the wells 30 and 32. Referring to FIG. 2B, the male portion 20 houses inner and outer conductors 38 and 40 electrically coupled to the male portion terminals 28a and 28b, respectively. The inner conductor 38 is in the shape of a central post that extends into the inner well 30 of female portion 18 when the male portion 20 is nested into the female portion 18. And the outer conductor 40 is in the form of a cylindrical ring concentrically disposed with respect to the inner conductor 38 such that it extends into the outer well 32 of female portion 18 when the male portion 20 is nested into the female portion 18. Thus, fixed terminal 26a is connected to rotary terminal 28a through the liquid metal in inner well 30 and the inner conductor 38; and fixed terminal 28a is connected to rotary terminal 28b through the liquid metal in outer well 32 and the outer conductor 40.

An important aspect of the present invention resides in the composition and characteristics of the novel liquid metal alloy captured in the inner and outer wells 30, 32 of the female portion 18 of rotary connector mechanism 16. The new alloy differs from the commercially available Gallium-Indium-Tin (GaInSn) alloy in that its composition additionally includes 2%-10% Zinc (Zn). A preferred composition of the new alloy, referred to herein as GaInSnZn, contains approximately 3.0% Zn. Like the known alloy GaInSn, the new alloy GaInSnZn is liquid at ambient temperatures, but unlike GaInSn, the new alloy GaInSnZn has a substantially lower melting point. As illustrated by the temperature scan analysis of FIG. 3 (where temperature in ° C. is represented by the trace 42 and heat flow in W/g is designated by the trace 44), the new alloy GaInSnZn exhibits a melting point of −36° C., and experimental testing has shown that it operates satisfactorily in the subject apparatus at temperatures as low as −40° C. A further advantage of the new alloy GaInSnZn relative to the known alloy GaInSn is that the constituent element Zinc is relatively low in cost compared to the other elements of the composition, thereby lowering the cost of the alloy, even as its melting point is significantly lowered.

While the preferred alloy composition includes 3% Zinc as described in the preceding paragraph, it should be appreciated that acceptable results for many liquid metal rotary connector applications may be achieved with a GaInSnZn alloy, where Zinc is present in a concentration range of 2%-10%. Also, alloys additionally containing up to 5% Bismuth (Bi) will provide acceptable results in the subject application. The following table sets forth three potential GaInSnZn alloy compositions, with Zinc present in concentrations of 3%, 5% and 7%, along with lower and upper ranges for each of the constituent elements.

| | Ga | In | Sn | Zn | Bi |
| --- | --- | --- | --- | --- | --- |
| 3% Zn | 66.4% | 20.9% | 9.7% | 3.0% | |
| 5% Zn | 65.1% | 20.4% | 9.5% | 5.0% | |
| 7% Zn | 63.7% | 20.0% | 9.3% | 7.0% | |
| Lower | 60% | 18% | 8% | 2% | 0% |
| Upper | 70% | 22% | 12% | 10% | 5% |

Figure 4:
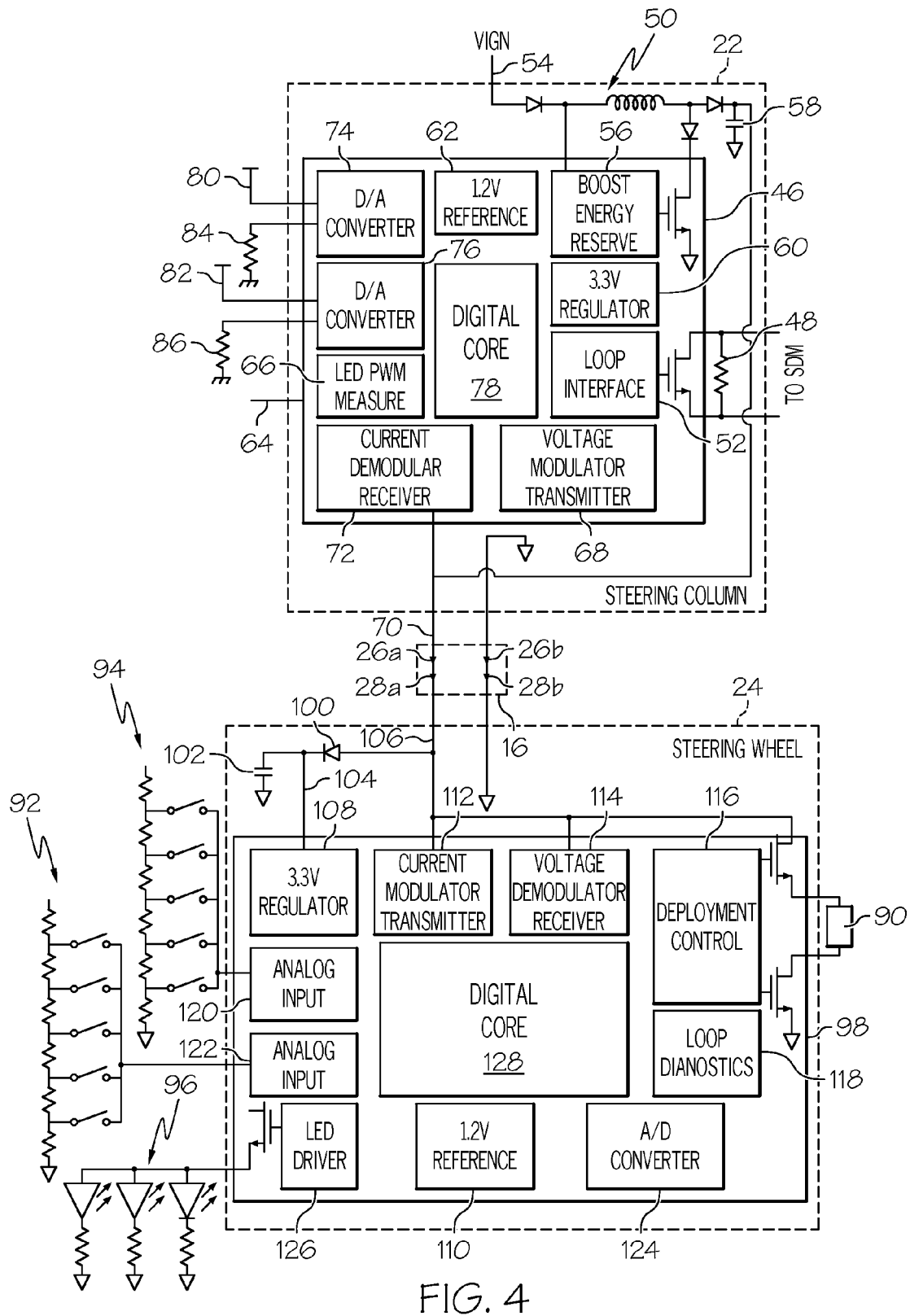
FIG. 4 depicts block diagrams of the steering column and steering wheel electronic modules.

FIG. 4 is essentially an electrical diagram of the vehicle steering mechanism 10. Thus, the female portion terminals 26a, 26b of rotary connector 16 are coupled to column electronic module 22, and the male portion terminals 28a, 28b of rotary connector mechanism 16 are coupled to wheel electronic module 24. The continuous conductive path through terminals 26b and 28b is used to establish a common ground potential in the column and wheel electronic modules 22 and 24, and the continuous conductive path through terminals 26a and 28a is used as a power and communication link between the column and wheel electronic modules 22 and 24.

Referring to column electronic module 22, the functional blocks within outline 46 are preferably implemented with an application specific integrated circuit (ASIC), while the elements outside the outline 46 represent discrete components. The discrete components within column electronic module 22 include a precision resistor 48 and a voltage boost circuit 50. The resistor 48 is used in connection with Loop Interface block 52 to support bi-directional data communication with the vehicle airbag control module (not shown). The voltage-boost circuit 50 receives vehicle ignition voltage $V_{IGN}$ on line 54, and in cooperation with Boost Energy Reserve block 56, generates a boosted voltage (typically 24V) across capacitor 58. Capacitor 58 is referenced to the common ground potential, and the boosted voltage is supplied to wheel electronic module 24 though the two-wire interface of rotary connector mechanism 16. The ignition voltage $V_{IGN}$ is also supplied to the column electronic module ASIC, which includes Voltage Regulator blocks 60 and 62 for generating an internal source voltage (3.3V) and an internal reference voltage (1.2V). A further input to column electronic module 22 includes a pulse-width-modulated signal on line 64 designating the desired lighting intensity for the back-lit switches of steering wheel 14; the input is supplied to LED PWM Measure block 66, which forms a corresponding digital light intensity signal.

The Supply/Voltage Modulator Transmitter block 68 transmits the light intensity signal and other data from column electronic module 22 to wheel electronic module 24 by modulating the voltage on power line 70. The other data may include, for example, airbag arming, deployment and diagnostic commands. Other functional blocks within the column electronic module ASIC include a Current Demodulator Receiver block 72 for receiving data transmitted by wheel electronic module 24, D/A Converter blocks 74 and 76 for communicating steering wheel switch states to relevant control modules in the vehicle, and a Digital Core block 78 for coordinating the operation and timing of the aforementioned functions. Finally, it will be noted that the D/A outputs 80 and 82 are referenced to the vehicle ground via external resistors 84 and 86.

The wheel electronic module 24 of the illustrated embodiment interfaces with several external components mounted on or in steering wheel 14, including an airbag squib 90, two resistor-ladder banks of switches 92, 94, and a bank of LEDs 96 for back-lighting the switches 92, 94. The wheel electronic module 24 itself includes a number of functional blocks within outline 98 that are preferably implemented with an application specific integrated circuit (ASIC), and a few discrete elements (diode 100 and capacitor 102) for establishing a steady supply voltage on line 104 from the incoming power line 106. The supply voltage on line 104 is supplied to the wheel electronic module ASIC, which includes Voltage Regulator blocks 108 and 110 for generating an internal source voltage (3.3V) and an internal reference voltage (1.2V). The incoming power line 106 is directly supplied to Current Modulator Transmitter block 112, Voltage Modulator Receiver block 114, and Deployment Control block 116. The airbag squib 90 is coupled to Deployment Control block 116 which initiates airbag deployment, and in conjunction with Loop Diagnostic block 118, obtains airbag diagnostic data for transmission to column electronic module 22. The steering wheel switch banks 92 and 94 are referenced to the common ground potential; their analog inputs are applied to the Analog Input blocks 120 and 122, and the A/D Converter block 124 converts the analog inputs to corresponding digital values. The bank of LEDs 96 is likewise referenced to the common ground potential, and is activated by the LED Driver block 126. Finally, the wheel electronic module ASIC also includes a Digital Core block 128 for coordinating the operation and timing of the above-mentioned wheel-related functions.

The Current Modulator Transmitter block 112 transmits the various data signals obtained by wheel electronic module 24 to column electronic module 22 by modulating the current on power line 70/106. The transmitted data may include, for example, airbag diagnostic information and switch state data. The Voltage Demodulator Receiver block 114 receives the voltage-modulated data transmitted by the Voltage Modulator Transmitter block 68 of column electronic module 22, and the Current Demodulator Receiver block 72 of column electronic module 22 receives the current-modulated data transmitted by Current Modulator Transmitter block 112 of wheel electronic module 24.

In summary, the present invention provides an improved rotary connector apparatus featuring a novel liquid metal alloy that is suitable for automotive and other harsh environments, and that provides both power transfer and data communication between electronic modules joined by the rotary connector apparatus. While the invention has been described with respect to the illustrated embodiment, it is recognized that numerous modifications and variations in addition to those mentioned herein will occur to those skilled in the art. For example, the rotary connector mechanism can support a different number of power and data channels, the various electronic module functions can be performed with microprocessor-based controllers, and so forth. Accordingly, it is intended that the invention not be limited to the disclosed embodiment, but that it have the full scope permitted by the language of the following claims.

The invention claimed is:

1. A rotary connector apparatus comprising:
    first and second electronic modules rotatable with respect to each other;
    a rotary connector mechanism having a first portion with a first pair of terminals that are electrically coupled to said first electronic module, a second portion nested within said first portion and having a second pair of terminals that are electrically coupled to said second electronic module, and a captured liquid metal for electrically coupling said first pair of terminals to said second pair of terminals so as to establish a common ground potential between said first and second electronic modules and a power line through which power is supplied from one of said first and second electronic modules to the other, where said liquid metal is an alloy comprising the elements Gallium, Indium, Tin, and Zinc in a concentration range of 2% to 10%;
    a first transmitter in said first electronic module for transmitting data to said second electronic module by modulating a voltage of said power line with respect to said common ground; and
    a second transmitter in said second electronic module for transmitting data to said first electronic module by modulating a current in said power line.

2. The rotary connector apparatus of claim 1, further comprising:
    a first receiver in said first electronic module for receiving the data transmitted by said second transmitter by de-modulating the current modulation of said power line; and
    a second receiver in said second electronic module for receiving the data transmitted by said first transmitter by de-modulating the voltage modulation of said power line.

* * * * *